United States Patent [19]

Gitzel et al.

[11] Patent Number: 5,069,994

[45] Date of Patent: Dec. 3, 1991

[54] USE OF COLORLESS, INTENSELY FLUORINATED AMMONIUM AND IMINIUM COMPOUNDS AS CHARGE CONTROL AGENTS FOR ELECTROPHOTOGRAPHIC RECORDING PROCESSES

[75] Inventors: Jörg Gitzel, Hattersheim am Main; Hans-Tobias Macholdt, Darmstadt; Alexander Sieber, Frankfurt am Main; Frank Wehowsky, Niedernhausen; Günther Prossel, Burgkirchen, all of Fed. Rep. of Germany

[73] Assignee: Hoechst Aktiengesellschaft, Frankfurt am Main, Fed. Rep. of Germany

[21] Appl. No.: 430,732

[22] Filed: Nov. 2, 1989

[30] Foreign Application Priority Data

Nov. 3, 1988 [DE] Fed. Rep. of Germany ....... 3837345

[51] Int. Cl.$^5$ .............................................. G03G 9/097
[52] U.S. Cl. .................. 430/110; 430/106.6; 430/137
[58] Field of Search ..................... 430/110, 109, 106.6, 430/137

[56] References Cited

U.S. PATENT DOCUMENTS

| | | | |
|---|---|---|---|
| 2,221,776 | 11/1940 | Carlson | 430/126 |
| 4,057,426 | 11/1977 | Mammino et al. | 252/62.1 |
| 4,496,643 | 1/1985 | Wilson et al. | 430/110 |
| 4,656,112 | 4/1987 | Kawagishi et al. | 430/110 |
| 4,681,830 | 7/1987 | Helland et al. | 430/110 |
| 4,683,188 | 7/1987 | Suzuki et al. | 430/110 |
| 4,684,596 | 8/1987 | Bonser et al. | 430/110 |
| 4,812,381 | 3/1989 | Bugner et al. | 430/110 |

Primary Examiner—John Goodrow
Attorney, Agent, or Firm—Connolly and Hutz

[57] ABSTRACT

The use of intensely fluorinated ammonium compounds of the general formula (I)

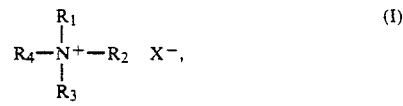

in which $R_1$ to $R_4$ denote hydrogen atoms or organic radicals, at least one of the radicals $R_1$ to $R_4$ denoting a straight-chain or branched fluorine-containing alkyl radical or fluorine-containing alkenyl radical which contains 1 to 69 carbon atoms and 3 to 66 fluorine atoms and which may be substituted, and at most three of the radicals $R_1$ to $R_4$ are, independently of one another, hydrogen atoms, straight-chain or branched alkyl radicals or alkenyl radicals containing 1 to 30 carbon atoms, aryl radicals or aralkyl radicals, and $X^-$ denotes an organic or inorganic anion, and of intensely fluorinated iminium compounds of the general formula (II)

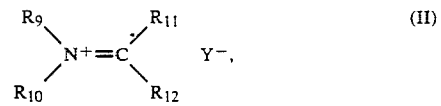

in which $R_9$ to $R_{12}$ denote hydrogen atoms or organic radicals, at least one of the radicals $R_9$ to $R_{12}$ denoting a straight-chain or branched fluorine-containing alkyl radical or fluorine-containing alkenyl radical which contains 1 to 69 carbon atoms and 3 to 66 fluorine atoms and which may be substituted, and at most three of the radicals $R_9$ to $R_{12}$ denote, independently of one another, hydrogen, straight-chain or branched alkyl radicals or alkenyl radicals containing 1 to 30 carbon atoms, aryl or aralkyl radicals and $Y^-$ is an organic or inorganic anion, as colorless charge control agents having positive or negative control effect in toners and developers for electrophotographic recording processes.

14 Claims, No Drawings

USE OF COLORLESS, INTENSELY FLUORINATED AMMONIUM AND IMINIUM COMPOUNDS AS CHARGE CONTROL AGENTS FOR ELECTROPHOTOGRAPHIC RECORDING PROCESSES

DESCRIPTION

The present invention relates to the use of intensely fluorinated ammonium and iminium compounds as colorless charge control agents for use in toners and developers for electrophotographic recording processes. As a result of the selective introduction of fluorine-containing organic radicals, the compounds according to the invention have particularly beneficial charge control properties.

In electrophotographic recording processes, a "latent charge image" is produced on a photoconductor. This is done, for example, by charging up a photoconductor by means of a corona discharge and then exposing the electrostatically charged-up surface of the photoconductor to an image, in which process the exposure brings about the charge drainage to the earthed substrate at the exposed points. The "latent charge image" produced in this way is then developed by applying a toner. In a subsequent step, the toner is transferred from the photoconductor to, for example, paper, textiles, films or plastic and fixed thereon, for example, by pressure, radiation, heat or exposure to solvent. The photoconductor used is then cleaned and is available for a new recording cycle.

Numerous patents describe the optimization of toners, in which connection, inter alia, the effect of the toner binder (variation of resin/resin components or wax/wax components), the effect of control agents or other additives or the effect of carriers (in the case of two-component developers) and magnetic pigments (in the case of single-component developers) were investigated (U.S. Pat. No. 2,221,776).

A measure of the quality of a toner is its specific chargeability Q/M (charge per unit mass). In addition to the sign and magnitude of the electrostatic charging, the rapid achievement of the desired magnitude of charging and the constancy of this charge throughout a prolonged activation period are, in particular, a decisive quality criterion. In practice, this is of central importance inasmuch as the toner may be exposed to a considerable activation time in the developer mixture before it is transferred to the photoconductor, since it sometimes remains in the developer mixture for a period in which up to several thousand copies are produced. In addition, the insensitivity of the toner to climatic effects such as temperature and atmospheric humidity is a further important criterion of suitability.

Both positively and negatively chargeable toners are used in copiers and laser printers, depending on the type of process and type of equipment.

In order to obtain electrophotographic toners or developers having either positive or negative triboelectric chargeability, so-called charge control agents (also called charge regulation agents) are often added. In this connection, in addition to the sign of the charge control the extent of the control effect is of importance since a higher effectiveness makes it possible to use a smaller amount.

Since, as a rule, toner binders alone produce a considerable change in the charging depending on the activation time, the object of a charge control agent is, on the one hand, to establish the sign and magnitude of the toner charging and, on the other, to counteract the charging drift of the toner binder and to ensure constancy of the toner charging. Charge control agents which are incapable of preventing the toner or developer exhibiting a high charging drift (aging) during a prolonged period of use and which may even result in the toner or developer undergoing a charge reversal are therefore unsuitable for practical use.

Full-color copiers and full-color laser printers employ the principle of trichromatism which makes an exact hue matching of the three primary colors (yellow pigment, cyan pigment and magenta pigment) necessary. The slightest displacements in the hue of even only one of the three primary colors requires of necessity a displacement in the hue of the two other colors in order to be able to produce full-color copies or full-color prints true to the original even under those circumstances. Owing to the precise matching of the coloristics of the individual pigments to one another, necessary in color toners, charge control agents having absolutely no inherent color are very particularly important.

In color toners, the three toners yellow, cyan and magenta have to be precisely matched to one another not only in relation to the precisely defined color requirements, but also in relation to their triboelectric properties. This triboelectric matching is necessary because, in the case of a full-color print or in the case of a full-color copy, the three color toners (or four color toners if black is included) have to be transferred consecutively in the same equipment.

It is known that color pigments may sometimes have a very intense effect on the triboelectric charging of toners (H. T. Macholdt, and A. Sieber, Dyes & Pigments 9 (1988), 119–27; U.S. Pat. No. 4,057,426; EP-A-247,576). Owing to the different triboelectric effects of color pigments and the very marked effects on the toner chargeability sometimes resulting therefrom, it is not possible to add them as the sole colorant to a toner base formulation once it has been produced. On the contrary, it may be necessary to produce for each colorant a particular formulation for which, for example, the type and amount of the charge control agent needed are specifically designed. This procedure is correspondingly elaborate and, in the case of color toners for process color (trichromatism), adds still further to the difficulties already described. Highly effective, colorless charge control agents which are capable of compensating for the differing triboelectric behavior of different pigments and imparting the required charging to the toner are therefore required. In this manner, triboelectrically very different pigments can be used in the different toners necessary (yellow, cyan, magenta) on the basis of a toner base formulation containing one and the same charge control agent once the formulation has been produced.

Colorless charge control agents for electrophotographic toners and developers which have been described are ammonium compounds (for example, EP-A-203,532, EP-A-242,420, U.S. Pat. No. 4,683,188, U.S. Pat. No. 4,684,596) and phosphonium compounds (for example, U.S. Pat. No. 3,893,935, U.S. Pat. No. 4,496,643), metal complexes and organometallic compounds (for example, U.S. Pat. No. 4,656,112, DE-A-3,144,017, JP-A-61-236,557, JP-A-62-127,754, JP-A-62-287,262), and also a number of other compounds (for example, EP-A-216,295).

Positive colorless charge control agents essentially include quaternary ammonium compounds and phosphonium compounds and also some organotin and organoantimony compounds. However, the colorless charge control agents known hitherto have a number of disadvantages which severely limit their use in practice or in some cases even make it impossible. Thus, the quaternary ammonium compounds, which are suitable per se, are difficult to disperse and may result in non-uniform charging of the toner, and the toner charge they produce is not stable over a prolonged activation time, in particular at high temperature and atmospheric humidity (EP-A-242,420). Furthermore, such compounds may be sensitive to light or mechanical effects (EP-A-203,532, U.S. Pat. No. 4,683,188) and thermally labile, and may yield decomposition products which may be disadvantageous for the triboelectric charging of the toner (U.S. Pat. No. 4,684,596). In addition, they often exhibit wax-like behavior, and in some cases solubility in water and low effectiveness as charge control agents (see Comparison Examples).

Phosphonium salts are less effective than ammonium salts as charge control agents (U.S. Pat. No. 4,496,643) and may present toxicological problems. Thus, for example, tetran-butylphosphonium bromide (U.S. Pat. No. 3,893,935), which is known as a charge control agent, is a strong skin and mucous membrane irritant.

Organotin borates as described in EP-A-216,295, and also organotin compounds (JP-A-62-287,262) and organoantimony compounds (JP-A-61-236,557) present problems owing to their heavy-metal content.

The known negative colorless charge control agents are almost exclusively heavy-metal compounds, namely chromium complexes, iron complexes, cobalt complexes (DE-A-3,144,017) and zinc complexes (U.S. Pat. No. 4,656,112, JP-A-62-127,754). In addition to the heavy-metal problems, it is also a disadvantage that some of these compounds are not really colorless and consequently find only limited use in color toners.

In addition to incorporation in the toner resin, charge control agents are also used for coating carriers. In this case, the same compound classes are used as for incorporation in toner resins, for example ammonium compounds (JP-A-61-258,270) and phosphonium compounds (JP-A-61-260,258), and also heavy-metal complexes and heavy-metal organic compounds (JP-A-61-147,261, JP-A-61-259,267).

Basically, it may be stated that colorless charge control agents are in principle known both for positive toners and for negative toners, but are only of limited suitability for use in practice, or are unusable, or still require substantial improvement.

The object of the present invention was therefore to find improved charge control agents which are distinguished by the absolute absence of an inherent color, have a higher effectiveness, are suitable, in particular, for use in color toners, and adjust the electrostatic charging of toners and developers rapidly and as a function of concentration. Furthermore, they should keep the electrostatic charging constant over a prolonged activation period (no aging), function satisfactorily, especially at high atmospheric humidity, and be compatible with common toner resins and readily dispersible.

Surprisingly, it has now emerged that ammonium compounds and iminium compounds which are intensely fluorinated have particularly beneficial properties as colorless charge control agents for electrophotographic toners and developers. Because of their colorlessness, high effectiveness, good compatibility and dispersibility in common toner resins and chemical inertness, the compounds are suitable, in particular, for use in color toners or color developers for full-color copiers based on the principle of trichromatism (subtractive color mixing), and even for colored toners or developers in general and for black toners or developers. Particularly surprising is the fact that substances of one and the same compound class, depending on the chemical modification, are suitable either as positive or as negative charge control agents (see Application Examples 2 and 4). Furthermore, the compounds are also suitable for coating carriers.

A considerable technical advantage of these readily dispersible compounds is that substances of the same compound class can be used either as positive or as negative control agents. Consequently, problems with incorporation into the toner binder and compatibility with the toner binder after producing a toner base formulation are minimized. Thus, positive toners and also negative toners can be produced on the basis of a fixed toner base formulation (composed of toner binder, pigment, flow promoter and other constituents) by incorporating the desired control agent.

The synthesis of fluorinated quaternary ammonium compounds and iminium compounds is known and is described in U.S. Pat. No. 3,535,381, FR-PS 2,153,489, DE-A-1,922,277, DE-A-2,244,297 and also DE-A-3,306,933. Such compounds are used, for example, as surface-active substances, emulsifiers and flow accelerators as described in DE-A-2,244,297, DE-PS 2,749,330, DE-A-3,347,378 and BE-PS 788,335. Completely novel, however, is their use as charge control agents in electrophotographic toners and developers.

The present invention relates to the use of intensely fluorinated ammonium compounds of the general formula (I)

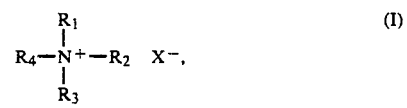

in which $R_1$ to $R_4$ denote hydrogen atoms or organic radicals, at least one of the radicals $R_1$ to $R_4$ denoting a straight-chain or branched fluorine-containing alkyl radical or fluorine-containing alkenyl radical which contains 1 to 69 carbon atoms and 3 to 66 fluorine atoms and which may contain hydroxyl and/or chloromethyl and/or carboxylic acid amide and/or sulfonic acid amide and/or urethane and/or amino and/or $R_5$-O-$R_6$ and/or

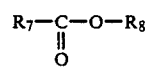

groups in which $R_5$, $R_6$, $R_7$ and $R_8$ are $(C_1$-$C_{30})$alkyl radicals and at most three of the radicals $R_1$ to $R_4$ are, independently of one another, hydrogen atoms, straight-chain or branched alkyl radicals or alkenyl radicals containing 1 to 30 carbon atoms, aryl radicals such as, for example, phenyl radicals or naphthyl radicals, or aralkyl radicals such as, for example, benzyl radicals, it being possible for the aryl radicals and aralkyl radicals to be substituted on the aromatic nucleus by $(C_1$-$C_{30})$ alkyl, $(C_1$-$C_{30})$alkoxy or hydroxyl groups or halogen atoms such as, for example, fluorine, chlorine, bromine or iodine atoms, and for two of the radicals $R_1$ to $R_4$ to join together to form a mono- or polynuclear ring system containing 4 to 12 carbon atoms which may be interrupted by 1 to 4 hetero atoms such as, for example, nitrogen, oxygen or sulfur atoms and may contain 0 to 6 double bonds and also be substituted by fluorine, chlorine, bromine or iodine atoms, $(C_1-C_6)$ alkyl, $(C_1-C_6)$ alkoxy, nitro or amino groups, and X. denotes an organic or inorganic anion, it being possible for the radicals $R_1$ to $R_4$ to be substituted by a $COO^-$ or $SO_3^-$ group and $X^-$ ceasing in this case to be applicable, and of intensely fluorinated iminium compounds of the general formula (II)

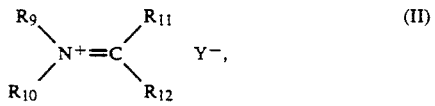

in which $R_9$ to $R_{12}$ denote hydrogen atoms or organic radicals, at least one of the radicals $R_9$ to $R_{12}$ denoting a straight-chain or branched fluorine-containing alkyl radical or fluorine-containing alkenyl radical which contains 1 to 69 carbon atoms and 3 to 66 fluorine atoms and which may contain hydroxyl and/or chloromethyl and/or carboxylic acid amide and/or sulfonic acid amide and/or urethane and/or amino and/or $R_5$—O—$R_6$ and/or $R_7C(O)$-O-$R_8$ groups, in which $R_5$, $R_6$, $R_7$ and $R_8$ have the abovementioned meanings, and at most three of the radicals $R_9$ to $R_{12}$ denote, independently of one another, hydrogen atoms, straight-chain or branched alkyl radicals or alkenyl radicals containing 1 to 30 carbon atoms, aryl radicals such as, for example, phenyl radicals or naphthyl radicals, aralkyl radicals such as, for example, benzyl radicals, it being possible for the aryl radicals or aralkyl radicals to be substituted on the aromatic nucleus by $(C_1-C_{30})$ alkyl, $(C_1-C_{30})$ alkoxy, hydroxyl groups or halogen atoms, and for two of the radicals $R_9$ to $R_{12}$ to join together to form a mono- or polynuclear ring system containing 4 to 17 carbon atoms which may be interrupted by 1 to 4 heteroatoms such as, for example, nitrogen, oxygen or sulfur atoms and may contain 2 to 9 double bonds and also be substituted by fluorine, chlorine, bromine or iodine atoms, a $(C_1-C_6)$ alkyl, $(C_1-C_6)$ alkoxy, nitro or amino group (in this case $R_{12}$ becomes one of the abovementioned radicals on the ring), and $Y^-$ is an organic or inorganic anion, it being possible for the radicals $R_9$ to $R_{12}$ to be substituted by a $COO^-$ or $SO_3^-$ group and $Y^-$ ceasing in this case to be applicable, as colorless charge control agents having positive or negative regulation effect in toners and developers for electrophotographic recording processes.

As organic or inorganic anion, $X^-$ or $Y^-$ may, for example, be $Hal^-$ such as, for example, $Cl^-$, $Br^-$ or $I^-$, and also $PF_6^-$, sulfate, phosphate, cyanate, thiocyanate, $BF_4^-$, $B(aryl)_4^-$ such as, for example, tetraphenyl borate, p-chlorotetraphenyl borate, p-methyltetraphenyl borate, tetranaphthyl borate, and also phenolate, nitrophenolate, zinc tetracyanate, zinc tetrathiocyanate, $CH_3OSO_3$, saturated or unsaturated aliphatic or aromatic carboxylate or sulfonate such as, for example, acetate, lactate, benzoate, salicylate, 2-hydroxy-3-naphthoate, 2-hydroxy-6-naphthoate, ethyl sulfonate, phenyl sulfonate, and also perfluorinated saturated or unsaturated aliphatic or aromatic carboxylate or sulfonate such as, for example, perfluoroacetate, perfluoroalkyl benzoate, perfluoroethyl sulfonate or perfluoroalkylbenzene sulfonate.

The ammonium compounds and iminium compounds of the abovementioned general formula (I) or (II) respectively may be used on their own or in combination in toners or developers which are used for electrophotographic copying or reproduction of masters and also for printing electronically, optically or magnetically stored information or in color proofing. In addition, these compounds can be used for coating carriers and in powders and paints for surface coating, in particular in electrokinetically sprayed powder coatings, as charge improving agents.

Particularly suitable are compounds of the said general formula (I) in which at least one of the radicals $R_1$ to $R_4$ denotes a straight-chain fluorine-containing alkenyl radical which contains 4 to 14 carbon atoms or a straight-chain or branched fluorine-containing alkyl radical which contains 13 to 69 carbon atoms and which may contain hydroxyl and/or chloromethyl and/or carboxylic acid amide and/or urethane and/or amino and/or $R_5$—O—$R_6$ groups in which $R_5$ and $R_6$ are $(C_1-C_{30})$ alkyl radicals, and at most three of the radicals $R_1$ to $R_4$ are, independently of one another, hydrogen atoms, straight-chain or branched alkyl radicals containing 1 to 18 carbon atoms, and X. is an organic or inorganic anion, it being possible for the radicals $R_1$ to $R_4$ to be substituted by a $COO^-$ or $SO_3^-$ group and $X^-$ in this case ceasing to be applicable.

Furthermore, compounds of the said general formula (I) are particularly suitable in which two of the radicals $R_1$ to $R_4$ can join together to form a mono- or polynuclear ring system containing 4 to 10 carbon atoms which may be interrupted by 1 to 4 hetero atoms such as, for example, nitrogen, oxygen or sulfur atoms and may contain 0 to 4 double bonds and also be substituted by fluorine, chlorine, bromine or iodine atoms, a $(C_1-C_6)$ alkyl, $(C_1-C_6)$ alkoxy, nitro or amino group, and at least one of the radicals $R_1$ to $R_4$ denotes a straight-chain fluorine-containing alkenyl radical which contains 4 to 14 carbon atoms or a straight-chain or branched fluorine-containing alkyl radical which contains 13 to 69 carbons atoms and which may contain hydroxyl and/or chloromethyl and/or carboxylic acid amide and/or urethane and/or amino and/or $R_5$—O—$R_6$ groups in which $R_5$ and $R_6$ are $(C_1-C_{30})$ alkyl radicals, and at most one of the radicals $R_1$ to $R_4$ denotes a hydrogen atom, a straight-chain or branched alkyl radical containing 1 to 18 carbon atoms, and $X^-$ denotes an organic or inorganic anion, it being possible for the radicals $R_1$ to $R_4$ to be substituted by a $COO^-$ or $SO_3^-$ group and $X^-$ in this case ceasing to be applicable.

Furthermore, compounds of the abovementioned general formula (II) are particularly suitable in which at least one of the radicals $R_9$ to $R_{12}$ denotes a straight-chain fluorine-containing alkenyl radical which contains 4 to 14 carbon atoms or a straight-chain or branched fluorine-containing alkyl radical which contains 13 to 69 carbon atoms and which may contain hydroxyl and/or chloromethyl and/or carboxylic acid amide and/or urethane and/or amino and/or $R_5$—O—$R_6$ groups in which $R_5$ and $R_6$ are $(C_1-C_{30})$ alkyl radicals, and at most three of the radicals $R_9$ to $R_{12}$ denote, independently of one another, hydrogen atoms, straight-chain or branched alkyl radicals containing 1 to 18 carbon atoms, and $Y^-$ denotes an organic or inorganic anion, it being possible for the radicals $R_9$ and $R_{12}$ to be substituted by a $COO^-$ or $SO_3^-$ group and $Y^-$ ceasing in this case to be applicable.

Furthermore, compounds of the abovementioned general formula (II) in which two of the radicals $R_9$ to $R_{12}$ can join together to form a mono- or polynuclear ring system containing 4 to 10 carbon atoms which may be interrupted by 1 to 4 hetero atoms such as, for example, nitrogen, oxygen or sulfur atoms and may contain 2 to 5 double bonds and also be substituted by fluorine, chlorine, bromine or iodine atoms, a ($C_1$-$C_6$) alkyl, ($C_1$-$C_6$) alkoxy, nitro or amino group (in that case, $R_{12}$ becomes one of the abovementioned substituents on the ring), and one of the radicals $R_9$ to $R_{12}$ denotes a straight-chain fluorine-containing alkenyl radical which contains 4 to 14 carbon atoms or a straight-chain or branched fluorine-containing alkyl radical which contains 13 to 69 carbon atoms and which may contain hydroxyl and/or chloromethyl and/or carboxylic acid amide and/or urethane and/or amino and/or $R_5$—O—$R_6$ groups in which $R_5$ and $R_6$ are ($C_1$-$C_{30}$) alkyl radicals, and $Y^-$ is an organic or inorganic anion, it being possible for the radicals $R_9$ to $R_{12}$ to be substituted by a $COO^-$ or $SO_3^-$ group and $Y^-$ ceasing in this case to be applicable.

Quite particularly suitable are compounds of the abovementioned general formula (I) in which at most three of the radicals $R_1$ to $R_4$ denote, independently of one another, a methyl, ethyl, stearyl, 2-hydroxyethyl or $-CH_2-CH_2-SO_3^-$ group ($X^-$ ceases in the latter case to be applicable) and at least one of the radicals $R_1$ to $R_4$ denotes one of the groupings

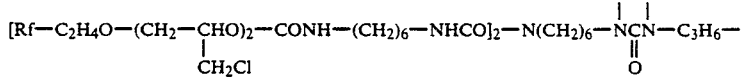

and

[$Rf-C_2H_4O-(CH_2-CHO)_2-CONH-(CH_2)_6-NHCO]_2-N(CH_2)_6-\underset{O}{\overset{H\ H}{\underset{||}{NCN}}}-C_3H_6-$ ($Rf=C_8F_{17}$—$C_{16}F_{33}$), it being possible for two of the radicals $R_1$ to $R_4$ to join together to form a pyrroline, pyrrolidine, piperidine, morpholine or indoline ring, and $X^-$ being $BF_4^-$, $Hal^-$, for example $Cl^-$, $Br^-$ or $I^-$, and also $CH_3-O-SO_3^-$, $B(aryl)_4^-$ such as, for example, tetraphenyl borate, p-chlorotetraphenyl borate, p-methyltetraphenyl borate or tetranaphthyl borate.

Of the compounds of the said general formula (II) those are quite particularly suitable in which at least one of the radicals $R_9$ to $R_{12}$ is a fluorine-containing alkyl radical which contains 1 to 14 carbon atoms and at most three of the radicals $R_9$ to $R_{12}$ are, independently of one another, methyl, ethyl, stearyl, 2-hydroxyethyl or $-CH_2-CH_3-O-SO_3^-$ groups ($Y^-$ ceasing in the latter case to be applicable), it being possible for two of the radicals $R_9$ to $R_{12}$ to join together to form a pyridine, pyrazine or quinoline ring, and $R_{12}$ then being a fluorine, chlorine, bromine or iodine atomm or a ($C_1$-$C_6$) alkyl, ($C_1$-$C_6$) alkoxy, nitro or amino group on the ring system, and $X^-$ being $BF_4^-$, $Hal^-$ such as, for example, $Cl^-$, $Br^-$ or $I^-$, and also $CH_3-O-SO_3^-$, $B(aryl)_4^-$ such as, for example, tetraphenyl borate, chloroetetraphenyl borate, p-methyltetraphenyl borate or tetranaphthyl borate.

As individual compounds or compound mixtures of the said general formulae (I) and (II) mention may be made, for example, of the following:

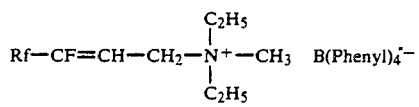 (1)

$Rf = C_5F_{11}-C_{11}F_{23}$ $(Rf-C_2H_4O-(CH_2-CHO)_2-CONH-(CH_2)_6-NHCO)_2-N(CH_2)_6-\underset{O}{\overset{H\ H}{\underset{||}{NCN}}}-C_3H_6-\underset{CH_3}{\overset{CH_3}{\underset{|}{N^+}}}-CH_3$ (2)

$CH_3OSO_3^-$ $Rf = C_8F_{17}-C_{16}F_{33}$

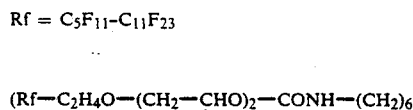 (3)

$Rf = C_5F_{11}-C_{11}F_{23}$

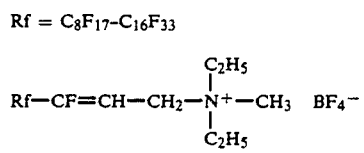 (4)

$Rf = C_5F_{11}-C_{11}F_{23}$

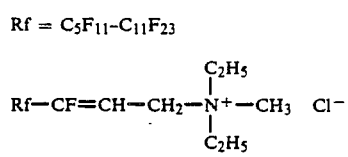 (5)

-continued

Rf = C₅F₁₁–C₁₁F₂₃

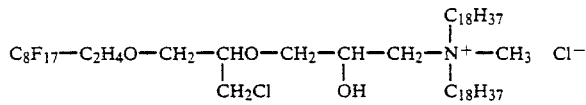
(6)

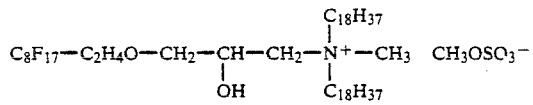
(7)

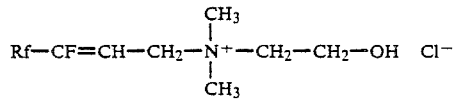
(8)

Rf = C₃F₇–C₁₆F₃₃

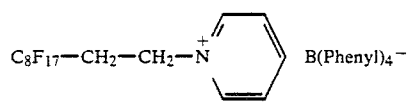
(9)

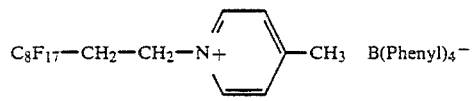
(10)

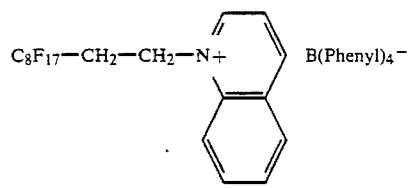
(11)

Thus, for example, a toner containing 0.5 to 1.0 percent by weight of compound (1) exhibits a charging of $-4.0$ or $-21.7$ $\mu$C/g after 10 minutes and of $-16.6$ or $-21.6$ $\mu$C/g after 24 hours of activation time (see Application Examples 1 and 2 of the Application Examples below).

A toner containing 2.5 percent by weight of the compound (2) has a chargeability of $+6.0$ $\mu$C/g after 10 minutes and of $+44.6$ $\mu$C/g after 24 hours of activation time (Application Example 3).

A toner containing 1.0 percent by weight of the compound (3) exhibits a chargeability of $+13.4$ $\mu$C/g after 10 minutes and of $+13.5$ $\mu$C/g after 24 hours of activation time (Application Example 4).

The compounds of the abovementioned general formulae (I) and (II) may also be absorbed on suitable carrier materials such as, for example, silica gel, aluminum oxide, titanium dioxide from suitable media such as, for example, solutions. Thus, a toner containing 3.0 percent by weight of the compound (5) absorbed on silica gel exhibits a charging of $+9.7$ $\mu$C/g after 10 minutes and of $+16.2$ $\mu$C/g after 24 hours of activation time. Compared with the free compound (5), whose action in the toner collapses at high atmospheric humidity, absorption on silica gel consequently achieves an exceptional effectiveness of the compound (5) even at high atmospheric humidity (Application Example 6).

As already described above, pigments in toners are known to be able to affect the electrostatic charging of the toner severely. By way of examples, mention may be made here of the colorant C.I. Pigment Red 57:1 and C.I. Solvent Blue 125. C.I. Pigment Red 57:1 gives a toner a high negative charging with severe drift towards further increasing negative charging during prolonged activation time. C.I. Solvent Blue 125 produces a high positive charging in a toner which drops to almost zero during prolonged activation time as a result of severe drift. It is all the more surprising that, if 5 percent by weight of the colorant C.I. Pigment Red 57:1 or C.I. Solvent Blue 125 is incorporated along with 1 percent by weight of the compound (1) in a toner, the natural triboelectric effect of these colorants is fully compensated for by the high effectiveness of compound (1) and the required toner charging is established (Application Example 7 to 10).

If other ammonium compounds or iminium compounds are used instead of a compound according to the invention, the corresponding toners exhibit a much lower charging and, in some cases, charge reversal after prolonged activation time (Comparison Examples 1 and 2).

The compounds according to the invention are, as a rule, homogeneously incorporated in the respective carrier material in a concentration of about 0.01 to about 10% by weight, preferably about 0.1 to about 5.0% by weight, in a known manner, for example, by kneading in or extruding. In this connection, the charge control agents can be added as dried or ground powders, dispersions or solutions, press cakes, master batches, as compounds absorbed on suitable carrier materials from aqueous or non-aqueous solution or in another suitable form. Equally, the compounds according to the invention can also in principle be added even during the preparation of the respective toner binders, i.e. in the course of the polymerization or polycondensation thereof. Typical toner binders are, for example, styrene resins, styrene acrylate resins, styrene butadiene resins, acrylate resins, polyester resins, amide resins, amine resins, ammonium resins, ethylene resins, phenolic resins or epoxy resins, individually or in combination, which may additionally contain further constituents such as pigments, waxes or flow promoters or which may have them added later.

The magnitude of the electrostatic charging of the electrophotographic toners in which the charge control agents claimed according to the invention have been homogeneously incorporated was measured using standard test systems under identical conditions (such as identical dispersion times, identical particle size distribution, identical particle shape) at room temperature and 50% relative atmospheric humidity and also at room temperature at 92% relative atmospheric humidity. For the measurement at 92% relative atmospheric humidity, the toner concerned was conditioned for 48 hours in a climatic chamber.

The toner in a two-component developer is activated by tumbling with a carrier (three parts by weight of toner to 97 parts by weight of carrier) on a roller mixer (150 revolutions per minute). Then the electrostatic charging is measured using a Q/M test bench (cf. J. H. Dessauer and H. E. Clark, "Xerography and related Processes", Focus Press, N.Y. 1965, page 289).

The particle size is of considerable influence in determining the Q/M value, and for this reason strict attention was paid to uniform particle size distribution in the toner samples obtained by classifying.

The Examples below serve to explain the invention without restricting it thereto. The parts referred to are parts by weight.

PREPARATION EXAMPLE 1

160 ml of water are added to 40 ml of a 0.5 molar aqueous solution (0.020 mol) of the compound mixture of the formula (5) (molecular weight 672) mentioned further above and then 22 ml of a 1.0 M aqueous solution of sodium tetraphenyl borate (0.022 mol) are added dropwise while stirring vigorously over a period of 15 to 20 minutes. The solution is made up to 500 ml with water and heated to 50° C. and the thick white precipitate is filtered off with suction while hot. The product is washed thoroughly with water and dried at 50° C. in an air-circulation oven.

Yield: 16.9 g (96.0% of theory) of the
compound (1)
Molecular weight: 880.
Melting point: 154–156° C.
Elementary analysis: calc. 4.1% H, 1.6% N, 1.2% B .
exp. 4.1% H, 1.6% N, 1.1% B,
0.05% water .
1H-NMR (in DMSO-d6): 1.20 (triplet, 6 methyl-H),
2.97 (singlet, 3-methyl-H), 3.30.
quartet, 4 ethyl-H), 4.25
(doublet, 2 allyl-H), 6.61
(doublet of triplets,
1 vinyl-H), 7.01 (multiplet, 20
phenyl-H) ppm.

PREPARATION EXAMPLE 2

The preparation of the compound (3) is carried out analogously to Preparation Example (1) using sodium tetrafluoroborate.

Yield: 12.3 g (95.0% of theory) of the
compound (3).
Molecular weight: 648.
Melting point: 202° C.
Elementary analysis: calc. 2.5% H, 2.2% N, 1.7% B
exp. 2.7% H, 2.3% N, 1.8% B,
0.5% water.
1; H NMR (in DMSO-d6): 1.24 (triplet, 6 methyl-H) 3.02
(singlet, 3 methyl-H), 3.37
(quartet, 4 ethyl-H), 4.28
(doublet, 2 allyl-H), 6.63
(doublet of triplets, 1 vinyl
H) ppm.

PREPARATION EXAMPLE 3

The compound (9) is prepared analogously to Preparation Example (1) using the corresponding per fluoroalkylpyridinium iodide and sodium tetraphenyl borate, and also isopropanol/water (1:1 parts by volume) as solvent.

Yield: 15.2 g (89.7 % of theory) of the
compound (9).
Molecular weight: 845 .
Melting point: 163° C.
Elementary analysis: calc. 55.4% C, 3.5% H, 1.7% N,
1.3% B, 38.2% F
exp. 55.2% C, 3.3% H, 1.6%.N,
1.2% B, 36.8% F, 0.19% water .
1H-NMR (in DMSO-d6): 3.25 (multiplet, 2 methylene-H),
4.97 (triplet, 2 methylene-H),
6.95 (multiplet, 20 phenyl-H),
8.62 (multiplet, 5 pyridyl-H)
ppm.

PREPARATION EXAMPLE 4

20 g of a 50% aqueous solution of the compound (5) are added to 20 g of silica gel ("Sipernat 22", manufactured by Degussa) and intimately mixed in a mixer. A fine, dry and readily free-flowing powder containing 25 percent by weight of the compound (5) is obtained.

The compounds (2) and also (4) to (8) were prepared analogously to U.S. Pat. No. 3,535,381, FR-PS 2,153,489, DE-A-1,922,277, DE-A-2,244,297, DE-A-3,606,933 and BE-PS 788,335, and the corresponding iodide as starting compound for the compounds (9) to (11) analogously to DE-A-1,922,277.

APPLICATION EXAMPLE 1

0.5 parts of the compound (1) were homogeneously worked into 99.5 parts of toner binder (Dialec S 309 manufactured by Diamond Shamrock, styrene-methacrylate copolymer 60:40) for 45 minutes by means of a kneader manufactured by Werner & Pfleiderer (Stuttgart). Grinding was then carried out on the universal laboratory mill 100 LU (manufactured by Alpine, Augsburg) and classification was then carried out on a centrifugal classifier 100 MZR (manufactured by Alpine). The desired particle fraction (4–25 μm) was activated with a carrier of the type 90 (Xerographic Carrier manufactured by Plasma Materials Inc.) composed of magnetite particles 50 to 200 μm in size coated with styrene-methacrylate copolymer 90:10. The measurement was carried out using a standard Q/M test bench (manufactured by Epping GmbH, Neufahrn); a sieve having a mesh size of 25 μm (manufactured by Gebr. Kufferath, Duren) was used to ensure that it was not possible for carrier to be entrained while blowing out the toner. The following Q/M values (μC/g) were measured as a function of the activation time:

| Activation time | Q/M (μC/g) | |
|---|---|---|
| | 50% relative humidity | 92% |
| 10 min | −4.0 | −0.6 |
| 30 min | −6.8 | −4.1 |
| 2 h | −10.1 | −9.7 |
| 24 h | −16.6 | −16.5 |

APPLICATION EXAMPLE 2

The procedure was as described in Application Example 1, with the difference that 1.0 part of the compound (1) was used in 99 parts of toner binder.

| Activation time | Q/M (μC/g) | |
|---|---|---|
| | 50% relative humidity | 92% |
| 10 min | −21.7 | −16.3 |
| 30 min | −22.5 | −20.1 |
| 2 h | −22.9 | −20.9 |
| 24 h | −21.6 | −19.0 |

APPLICATION EXAMPLE 3

The procedure was as described in Application Example 1 with the difference that 2.5 parts of the compound (2) were used in 95 parts of toner binder.

| Activation time | Q/M (μC/g) | |
|---|---|---|
| | 50% relative humidity | 92% |
| 10 min | +6.0 | +3.0 |
| 30 min | +9.6 | +3.0 |
| 2 h | +23.6 | +1.3 |
| 24 h | +44.6 | +18.3 |

APPLICATION EXAMPLE 4

The procedure was as described in Application Example 1, with the difference that 1.0 part of the compound (3) was used in 99 parts of toner binder.

| Activation time | Q/M (μC/g) | |
|---|---|---|
| | 50% relative humidity | 92% |
| 10 min | +13.4 | +11.9 |
| 30 min | +16.9 | +15.7 |
| 2 h | +17.5 | +16.4 |
| 24 h | +13.5 | +15.9 |

APPLICATION EXAMPLE 5

The procedure was as described in Application Example 1, with the difference that 1.0 part of the compound (4) was used in 99 parts of toner binder.

| Activation time | Q/M (μC/g) | |
|---|---|---|
| | 50% relative humidity | 92% |
| 10 min | +12.8 | +13.0 |
| 30 min | +15.5 | +14.9 |
| 2 h | +17.1 | +17.1 |
| 24 h | +16.8 | +18.3 |

APPLICATION EXAMPLE 6

The procedure was as described in Application Example 1, with the difference that 3.0 parts of the compound (5) (in the form of 25 percent by weight of (5) on silica gel ("Sipernat 22", manufactured by Degussa)) were used in 91 parts of toner binder and 6 parts of silica gel.

| Activation time | Q/M (μC/g) | |
|---|---|---|
| | 50% relative humidity | 92% |
| 10 min | +9.7 | +12.0 |
| 30 min | +11.9 | +13.2 |
| 2 h | +14.1 | +13.9 |
| 24 h | +16.2 | +15.7 |

APPLICATION EXAMPLE 7

5.0 parts of the colorant C.I. Pigment Red 47:1 were homogeneously worked into 95 parts of toner binder as described in Application Example 1.

| Activation time | Q/M (μC/g) 50% relative humidity |
|---|---|
| 10 min | −3.4 |
| 30 min | −19.5 |
| 2 h | −52.4 |
| 24 h | −63.9 |

APPLICATION EXAMPLE 8

5.0 parts of the colorant C.I. Solvent Blue 125 were homogeneously worked into 95 parts toner binder as described in Application Example 1.

| Activation time | Q/M (μC/g) 50% relative humidity |
|---|---|
| 10 min | +27.9 |
| 30 min | +19.2 |
| 2 h | +7.5 |
| 24 h | +9.0 |

APPLICATION EXAMPLE 9

1.0 parts of the compound (1) and 5.0 parts of C.I. Pigment Red 57:1 were homogeneously worked into 95 parts of toner binder as described in Application Example 1.

| Activation time | Q/M (μC/g) | |
|---|---|---|
| | 50% relative humidity | 92% |
| 10 min | −19.6 | −7.3 |
| 30 min | −22.1 | −12.6 |
| 2 h | −26.3 | −17.1 |
| 24 h | −23.3 | −15.0 |

APPLICATION EXAMPLE 10

1.0 part of the compound (1) and 5.0 parts of C.I. Solvent Blue 125 were homogeneously worked into 94 parts of toner binder as described in Application Example 1.

| Activation | Q/M ($\mu$C/g) | |
|---|---|---|
| time | 50% relative humidity | 92% |
| 10 min | −3.5 | +0.7 |
| 30 min | −7.7 | −2.0 |
| 2 h | −8.7 | −5.3 |
| 24 h | −14.4 | −10.0 |

APPLICATION EXAMPLE 11

The procedure was as described in Application Example 1, with the difference that 1.0 part of the compound (9) was homogeneously worked into 99 parts of toner binder.

| Activation | Q/M ($\mu$C/g) | |
|---|---|---|
| time | 50% relative humidity | 92% |
| 10 min | −11.8 | +3.7 |
| 30 min | −11.0 | −5.9 |
| 2 h | −11.7 | −4.4 |
| 24 h | −14.7 | −8.0 |

COMPARISON EXAMPLE 1

The procedure was as described in Application Example 1, with the difference that 1.0 part of cetylpyridinium chloride was homogeneously worked into 99 parts of toner binder.

| Activation time | Q/M ($\mu$C/g) 50% relative humidity |
|---|---|
| 10 min | +12.6 |
| 30 min | +7.6 |
| 2 h | +0.9 |
| 24 h | −9.7 |

COMPARISON EXAMPLE 2

The procedure was as described in Application Example 1, with the difference that 1.0 part of benzyltrimethyl-ammonium chloride was used in 99 parts of toner binder.

| Activation time | Q/M ($\mu$C/g) 50% relative humidity |
|---|---|
| 10 min | +2.7 |
| 30 min | −0.4 |
| 2 h | −1.5 |
| 24 h | −4.6 |

We claim:

1. A method for effecting in toners and developers a positive or negative charge control effect (for electrophotographic recording processes) comprising the step of incorporating the compounds of the formula (I)

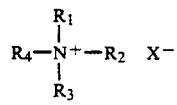

in which $R_1$ to $R_4$ denote hydrogen atoms or organic radicals, at least one of the radicals $R_1$ to $R_4$ denoting a straight-chain or branched fluorine-containing alkyl radial or fluorine-containing alkenyl radical which contains 1 to 69 carbon atoms and 3 to 66 fluorine atoms and which may contain hydroxyl and/or chloromethyl and/or carboxylic acid amide and/or sulfonic acid amide and/or urethane and/or amino and/or $R_5$—O—$R_6$ and/or $R_7$—C(O)—O—$R_8$ groups in which $R_5$, $R_6$, $R_7$ and $R_8$ and ($C_1$-$C_{30}$) alkyl radicals and at most three of the radicals $R_1$ to $R_4$ are, independently of one another, hydrogen atoms, straight-chain or branched alyl radicals or alkenyl radicals containing 1 to 30 carbon atoms, aryl radicals or aralkyl radicals which may be substituted by ($D_1$-$C_{30}$) alkyl, ($C_1$-$C_{30}$) alkoxy or hydroxyl groups or halogen atoms, it being possible for two of the radicals $R_1$ to $R_4$ to join together to form a mono- or polynuclear ring system containing 4 to 12 carbon atoms which may be interrupted by 1 to 4 hetro atoms and may contain 0 to 6 double bonds and also be substituted by fluorine, chlorine, bromine or iodine atoms, ($C_1$-$C_6$) alkyl, ($C_1$-$C_6$) alkoxy, nitro or amino groups, and $X^-$ denotes an organic or inorganic anion, it being possible for the radicals $R_1$ to $R_4$ to be substituted by a COO$^-$ or SO$_3^-$ group and $X^-$ ceasing in this case to be applicable, and of intensely fluorinated iminium compounds of the formula (II)

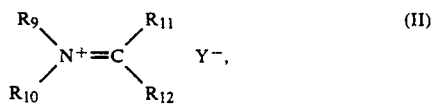

in which $R_9$ to $R_{12}$ denote hydrogen atoms or organic radicals, at least one of the radicals $R_9$ to $R_{12}$ denoting a straight-chain or branched fluorine-containing alkyl radical or fluorine-containing alkenyl radical which contains 1 to 69 carbon atoms and 3 to 66 fluorine atoms and which may contain hydroxyl and/or chloromethyl and/or carboxylic acid amide and/or sulfonic acid amide and/or urethane and/or amino and/or $R_5$—O—$R_6$ and/or $R_7$C(O)—O—$R_8$ groups, in which $R_5$,$R_6$, $R_7$ and $R_8$ have the abovementioned meanings, and at most three of the radicals $R_9$ to $R^{12}$ denote, independently of one another, hydrogen atoms, straight-chain or branched alkyl radicals or alkenyl radicals containing 1 to 30 carbon atoms, it being possible for the aryl radials or aralkyl radicals to be substituted on the aromatic nucleus by ($C_1$-$C_{30}$) alkyl, ($C_1$-$C_{30}$) alkoxy, hydroxyl groups or halogen atoms, and for two of the radicals $R_9$ to $R^{12}$ to join together to form a mono- or polynuclear ring system containing 4 to 17 carbon atoms which may be interrupted by 1 to 4 heteroatoms and may contain 2 to 9 double bonds and also be substituted by fluorine, chlorine, bromine or iodine atoms, ($C_1$-$C_6$) alkyl, ($C_1$-$C_6$) akloxy, nitro or amino groups, and $Y^-$ is an organic or inorganic anion, it being possible for the radicals $R_9$ to $R_{12}$ to be substituted by a COO$^-$ or SO$_3^-$ group and $Y^-$ in this case ceasing to be applicable, as colorless charge control agents having positive or negative charge control effect in toners and developers for electrophotographic recording processes.

2. A method as claimed in claim 1, wherein, in the formula (I) of claim 1, at least one of the radicals $R_1$ to $R_4$ denotes a straight-chain fluorine-containing alkenyl radical which contains 4 to 14 carbon atoms or a straight-chain or branched fluorine-containing alkyl radical which contains 13 to 69 carbon atoms and which may contain hydroxyl and/or chloromethyl and/or carboxylic acid amide and/or urethane and/or amino and/or $R_5$—O—$R_6$ groups in which $R_5$ and $R_6$ are ($C_1$-$C_{30}$) alkyl radicals, and at most three of the radicals $R_1$ to $R_4$ are, independently of one another, hydrogen atoms, straight-chain or branched alkyl radicals containing 1 to 18 carbon atoms, and $X^-$ is an organic or inorganic anion, it being possible for the radicals $R_1$ to $R_4$ to be substituted by a $COO^-$ or $SO_3^-$ group and $X^-$ in this case ceasing to be applicable.

3. A method as claimed in claim 1, wherein, in the formula (I) of claim 1, two of the radicals $R_1$ to $R_4$ form a mono- or polynuclear ring system containing 4 to 10 carbon atoms which may be interrupted by 1 to 4 hetero atoms and may contain 0 to 4 double bonds and also be substituted by fluorine, chlorine, bromine or iodine atoms, ($C_1$-$C_6$) alkyl, ($C_1$-$C_6$) alkoxy, nitro or amino groups, and at least one of the radicals $R_1$ to $R_4$ denotes a straight-chain fluorine-containing alkenyl radical which contains 4 to 14 carbon atoms or a straight-chain or branched fluorine-containing alkyl radical which contains 13 to 69 carbons atoms and which may contain hydroxyl and/or chloromethyl and/or carboxylic acid amide and/or urethane and/or amino and/or $R_5$—O—$R_6$ groups in which $R_5$ and $R_6$ are ($C_1$-$C_{30}$) alkyl radicals, and at most one of the radicals $R_1$ to $R_4$ denotes a hydrogen atom, a straight-chain or branched alkyl radical containing 1 to 18 carbon atoms, and $X^-$ denotes an organic or inorganic anion, it being possible for the radicals $R_1$ to $R_4$ to be substituted by a $COO^-$ or $SO_3^-$ group and $X^-$ ceasing in this case to be applicable.

4. A method as claimed in claim 1, wherein, in the formula (II) of claim 1, at least one of the radicals $R_9$ to $R_{12}$ denotes a straight-chain fluorine-containing alkenyl radical which contains 4 to 14 carbon atoms or a straight-chain or branched fluorine-containing alkyl radical which contains 13 to 69 carbon atoms and which may contain hydroxyl and/or chloromethyl and/or carboxylic acid amide and/or urethane and/or amino and/or $R_5$—O—$R_6$ groups in which $R_5$ and $R_6$ are ($C_1$-$C_{30}$)alkyl radicals, and at most three of the radicals $R_9$ to $R_{12}$ denote, independently of one another, hydrogen atoms, straight-chain or branched alkyl radicals containing 1 to 18 carbon atoms, and $Y^-$ denotes an organic or inorganic anion, it being possible for the radicals $R_9$ and $R_{12}$ to be substituted by a $COO^-$ or $SO_3^-$ group and $Y^-$ ceasing in this case to be applicable.

5. A method as claimed in claim 1, wherein, in the formula (II) of claim 1, two of the radicals $R_9$ to $R_{12}$ form a mono- or polynuclear ring system containing 4 to 10 carbon atoms which may be interrupted by 1 to 4 hetero atoms from the series nitrogen, sulfur or oxygen and may contain 2 to 5 double bonds and also be substituted by fluorine, chlorine, bromine or iodine atoms, ($C_1$-$C_6$) alkyl, ($C_1$-$C_6$) alkoxy, nitro or amino groups, and at least one of the radicals $R_9$ to $R_{12}$ denotes a fluorine-containing alkenyl radical which contains 4 to 14 carbon atoms or a straight-chain or branched fluorine-containing alkyl radical which contains 13 to 69 carbon atoms and which may contain hydroxyl and/or chloromethyl and/or carboxylic acid amide and/or urethane and/or amino and/or $R_5$—O—$R_6$ groups in which $R_5$ and $R_6$ are ($C_1$-$C_{30}$) alkyl radicals, and $Y^-$ is an organic or inorganic anion, it being possible for the radicals $R_9$ to $R_{12}$ to be substituted by a $COO^-$ or $SO_3^-$ group and $Y^-$ ceasing in this case to be applicable.

6. A method as claimed in claim 1 wherein, in the formulae (I) and (II) of claim 1, $X^-$ and $Y^-$ denote $Cl^-$, $Br^-$, $I^-$, $PF_6^-$, sulfate, phosphate, cyanate, thiocyanate, $BF_4^-$, tetraphenyl borate, p-chlorotetraphenyl borate, p-methyltetraphenyl borate, tetranaphthyl borate, phenolate, nitrophenolate, zinc tetracyanate, zinc tetrathiocyanate, $CH_3OSO_3^-$, saturated or unsaturated aliphatic or aromatic carboxylate or sulfonate, perfluorinated saturated or unsaturated aliphatic or aromatic carboxylate or sulfonate.

7. A method as claimed in claim 1, wherein, in the formula (I) of claim 1, at most three of the radicals $R_1$ to $R_4$ denote, independently of one another, a methyl, ethyl, stearyl, 2-hydroxyethyl or —$CH_2$—$CH_2$—$SO_3^-$ group ($X^-$ ceases in the latter case to be applicable) and at least one of the radicals $R_1$ to $R_4$ denotes one of the groupings

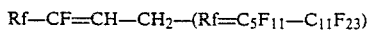

and

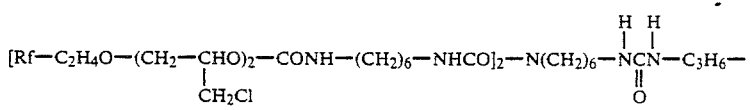

$(Rf = C_8F_{17}\text{-}C_{16}F_{33})$ it being possible for two of the radicals $R_1$ to $R_4$ to form a pyrroline, pyrrolidine, piperidine, morpholine or indoline ring, and X being $BF_4^-$, $Cl^-$, $Br^-$, $I^-$ $CH_3$—O—$SO_3^-$, tetraphenyl borate, p-chlorotetraphenyl borate, p-methyltetraphenyl borate or tetranaphthyl borate.

8. A method as claimed in claim 1, wherein, in the formula (II) of claim 1, at least one of the radicals $R_9$ to $R_{12}$ is a fluorine-containing alkyl radical containing 1 to 14 carbon atoms and at most three of the radicals $R_9$ to $R_{12}$ are, independently of one another, methyl, ethyl, stearyl, 2-hydroxyethyl or —$CH_2$—$CH_2$—$SO_3^-$ groups ($Y^-$ ceasing in the latter case to be applicable), it being possible for two of the radicals $R_9$ to $R_{12}$ to form a pyridine, pyrazine or quinoline ring, and $R_{12}$ then being a fluorine, chlorine, bromine or iodine atom or a ($C_1$-$C_6$)alkyl, ($C_1$-$C_6$)alkoxy, nitro or amino group on the ring system, and $X^-$ being $BF_4^-$, $Cl^-$, $Br^-$, $I^-$, $CH_3$—O—$SO_3^-$, tetraphenyl borate, chlorotetraphenyl borate, p-methyltetraphenyl borate or tetranaphthyl borate.

9. A method as claimed in claim 1, wherein the compounds of the formulae (I) and (II) of claim 1, individually or in combination, are used in a concentration of about 0.01 to about 10% by weight.

10. A method for preparing toners or developers applicable for the elecrophotographic copying or reproduction of masters, the printing of electronically, optically or magnetically stored information or the color proofing comprising the step of incorporating a compound of the formulae (I) or (II) of claim 1, individually or in combination, into the toners or developers.

11. A method for coating carriers applicable for developers for the electrophotographic copying or reproduction of masters, the printing of electronically, optically or magnetically stored information or the color proofing comprising the step of coating the carriers with the compounds, individually or in combination, of the formulae (I) or (II) of claim 1.

12. A method for surface-coating of objects of metal, wood, resin, glass, ceramic, concrete, textile material, paper or rubber comprising the step of incorporating a compound of the formulae (I) or (II) of claim 1, individually or in combination, as a charge improving (enhancing) agent into powders and paints, in particular in electrokinetically sprayed powder coatings, for applying to the surface of the said objects.

13. A method for effecting in toners and developers a positive or negative charge control effect comprising the step of incorporating the compounds of the formula (I)

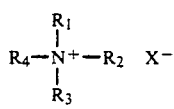

in which $R_1$ to $R_4$ denote hydrogen atoms or organic radicals, at least one of the radicals $R_1$ to $R_4$ denoting a straight-chain or branched fluorine-containing alkyl radicals or fluorine-containing alkenyl radicals which contains 1 to 69 carbon atoms and 3 to 66 fluorine atoms and which may contain hydroxyl and/or chloromethyl and/or carboxylic acid amide and/or sulfonic acid amide and/or urethane and/or amino and/or $R_5$—O—$R_6$ and/or $R_7$—C(O)—O—$R_8$ groups in which $R_5$, $R_6$, $R_7$ and $R_8$ are ($C_1$-$C_{30}$) alkyl radicals and at most three of the radicals $R_1$ to $R_4$ are, independently of one another, hydrogen atoms, straight-chain or branched alkyl radicals or alkenyl radicals containing 1 to 30 carbon atoms, aryl radicals or aralkyl radicals which may be substituted by ($C_1$-$C_{30}$) alkyl, ($C_1$-$C_{30}$) alkoxy or hydroxyl groups or halogen atoms, it being possible for two of the radicals $R_1$ to $R_4$ to join together to form a mono- or polynuclear ring system containing 4 to 12 carbon atoms which may be interrupted by 1 to 4 hetero atoms and may contain 0 to 6 double bonds and also be substituted by fluorine, chlorine, bromine or iodine atoms, ($C_1$-$C_6$) alkyl, ($C_1$-$C_6$) alkoxy, nitro or amino groups, and $X^-$ denotes an organic or inorganic anion, it being possible for the radicals $R_1$ to $R_4$ to be substituted by a $COO^-$ or $SO_3^-$ group and $X^-$ ceasing in this case to be applicable, or an intensely fluorinate iminium compound of the formula

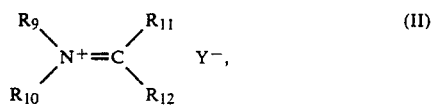

in which $R_9$ to $R_{12}$ denote hydrogen atoms or organic radicals, at least one of the radicals $R_9$ to $R_{12}$ denoting a straight-chain or branched fluorine-containing alkyl radical or fluorine-containing alkenyl radial which contains 1 to 69 carbon atoms and 3 to 66 fluorine atoms and which may contain hyroxyl and/or chloromethyl and/or carboxylic acid amide and/or sulfonic acid amide and/or urethane and/or amino and/or $R_5$—O—$R_6$ and/or $R_7$C(O)—O—$R_8$ groups, in which $R_5$, $R_6$, $R_7$, and $R_8$ have the abovementioned meanings, and at most three of the radicals $R_9$ to $R_{12}$ denote, independently of one another, hydrogen atoms, straight-chain or branched alkyl radicals or alkenyl radicals containing 1 to 30 carbon atoms, it being possible for the aryl radicals or aralkyl radicals to be substituted on the aromatic nucleus by ($C_1$-$C_{30}$) alkyl, ($C_1$-$C_{30}$) alkoxy, hydroxyl groups or halogen atoms, and for two of the radicals $R_9$ to $R_{12}$ to join together to from a monoor polynuclear ring system containing 4 to 17 carbon atoms which may be interrupted by 1 to 4 heteroatoms and may contain 2 to 9 double bonds and also be substituted by fluorine, chlorine, bromine or iodine atoms, ($C_{1-C_6}$) alkyl, ($C_1$-$C_6$) alkoxy, nitro or amino groups, and $Y^-$ is an organic or inorganic anion, it being possible for the radicals $R_9$ to $R_{12}$ to be substituted by $COO^-$ or $SO_3^-$ group and $Y^-$ in this case ceasing to be applicable, or a combination of a said compound of formula (I) and a said compound of formula II, as colorless charge control agents having positive or negative charge control effect in toners and developers for electrophotographic recording processes.

14. A method as claimed in claim 13, wherein said charge control is present in an amount ranging from about 0.01% to about 10% by weight.

* * * * *

UNITED STATES PATENT AND TRADEMARK OFFICE
CERTIFICATE OF CORRECTION

PATENT NO.: 5,069,994

DATED: December 3, 1991

INVENTOR(S): Jörg Gitzel, Hans-Tobias Macholdt, Alexander Sieber, Frank Wehowsky and Günther Prossel It is certified that error appears in the above-identified patent and that said Letters Patent is hereby corrected as shown below:

In column 6, line 26 "X." should read --X- --.

In column 8, line 1 "Rf-CF=CH-CH$_2$-(Rf=C$_5$F$_{11}$-C$_{11}$F$_{23}$)" should read --Rf-CF=CH-CH$_2$-    (Rf=C$_5$F$_{11}$-C$_{11}$F$_{23}$) --.

In column 8, line 27 "atomm" should read --atom--.

In column 8, line 32 "chloroetetraphenyl" should read

--chlorotetraphenyl--.

In column 12, line 13 "1;H" should read --1H--.

In column 12, line 18 "vinyl" should read --vinyl- --.

In column 12, line 24 "per fluo" should read --perfluo--.

UNITED STATES PATENT AND TRADEMARK OFFICE
CERTIFICATE OF CORRECTION

PATENT NO.: 5,069,994

DATED: December 3, 1991

INVENTOR(S): Jörg Gitzel, Hans-Tobias Macholdt, Alexander Sieber, Frank Wehowsky and Günther Prossel It is certified that error appears in the above-identified patent and that said Letters Patent is hereby corrected as shown below:

In Claim 1:

At column 16, line 10 "radial" should be --radical--.

At column 16, line 19 "alyl" should read --alkyl--.

At column 16, line 21 "$D_1$" should read --$C_1$--.

At column 16, line 27 "hetro" should read --hetero--.

At column 16, lines 51 and 59 "$R^{12}$" should read --$R_{12}$--.

At column 16, line 64 "akloxy" should read --alkoxy--.

In Claim 7:

At column 18, line 34 "Rf-CF=CH-$CH_2$-(Rf=$C_5F_{11}$-$C_{11}F_{23}$)" should read --Rf-CF=CH-$CH_2$-     (Rf=$C_5F_{11}$-$C_{11}F_{23}$)--.

UNITED STATES PATENT AND TRADEMARK OFFICE
CERTIFICATE OF CORRECTION

PATENT NO.: 5,069,994

DATED: December 3, 1991

INVENTOR(S): Jörg Gitzel, Hans-Tobias Macholdt, Alexander Sieber, Frank Wehowsky and Günther Prossel It is certified that error appears in the above-identified patent and that said Letters Patent is hereby corrected as shown below:

At column 18, line 49 "X" should read --X- --.

At column 18, line 49 please insert a comma (--,--) between "I-" and "CH$_3$--".

<u>In claim 13:</u>

At column 19, line 38 each occurence "radicals" should read --radical--.

At column 20, line 9 "fluorinate" should read --fluorinated--.

At column 20, line 34, the last word "monoor" should read --mono-or--.

Signed and Sealed this

Sixth Day of July, 1993

*Attest:*

MICHAEL K. KIRK

*Attesting Officer*   Acting Commissioner of Patents and Trademarks